United States Patent
Smit et al.

(10) Patent No.: US 9,382,395 B2
(45) Date of Patent: Jul. 5, 2016

(54) RUBBER MATERIAL WITH BARRIER MATERIAL MADE OF CYCLOOLEFIN COPOLYMERS

(71) Applicant: BASF SE, Ludwigshafen (DE)

(72) Inventors: Theo Smit, Heidelberg (DE); Kevin Mueller, Waldems (DE); Stefan Dahmen, Bad Duerkheim (DE); Norma Lidia Negrete Herrera, Maxdorf (DE); Bernhard Sturm, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/421,532

(22) PCT Filed: Aug. 2, 2013

(86) PCT No.: PCT/EP2013/066287
§ 371 (c)(1),
(2) Date: Feb. 13, 2015

(87) PCT Pub. No.: WO2014/026865
PCT Pub. Date: Feb. 20, 2014

(65) Prior Publication Data
US 2015/0218328 A1    Aug. 6, 2015

Related U.S. Application Data

(60) Provisional application No. 61/682,334, filed on Aug. 13, 2012.

(30) Foreign Application Priority Data

Aug. 13, 2012  (EP) .................................... 12180272

(51) Int. Cl.
| | | |
|---|---|---|
| C08F 10/00 | (2006.01) | |
| C08C 19/04 | (2006.01) | |
| C08G 61/08 | (2006.01) | |
| C08F 2/46 | (2006.01) | |
| B32B 27/32 | (2006.01) | |
| B05D 3/02 | (2006.01) | |
| C08J 7/18 | (2006.01) | |
| B60C 5/02 | (2006.01) | |
| C08J 7/04 | (2006.01) | |
| C09D 165/00 | (2006.01) | |
| B60C 1/00 | (2006.01) | |
| C08F 232/08 | (2006.01) | |
| C09D 145/00 | (2006.01) | |

(52) U.S. Cl.
CPC .............. C08J 7/047 (2013.01); B60C 1/0008 (2013.04); C08F 232/08 (2013.01); C08G 61/08 (2013.01); C09D 145/00 (2013.01); C09D 165/00 (2013.01); C08G 2261/3322 (2013.01); C08G 2261/3324 (2013.01); C08G 2261/418 (2013.01); C08G 2261/612 (2013.01); C08J 2307/00 (2013.01); C08J 2445/00 (2013.01); Y10T 428/31833 (2015.04)

(58) Field of Classification Search
CPC ........... C08G 61/08; C08G 2261/3322; C08G 2261/3324; C08G 2261/418; C08G 2261/612; C09D 165/00; C09D 145/00; B60C 1/0008; C08F 232/08; C08J 7/047; C08J 2307/00; C08J 2445/00; Y10T 428/31833
USPC ........ 152/510; 427/393.5, 532; 428/220, 494; 522/129; 524/553; 525/388; 526/281
See application file for complete search history.

(56) References Cited

U.S. PATENT DOCUMENTS

| | | | |
|---|---|---|---|
| 879,753 A * | 2/1908 | Muller ................. | B65D 21/086 220/8 |
| 3,778,420 A | 12/1973 | Brown et al. | |
| 4,025,708 A | 5/1977 | Minchak et al. | |
| 5,621,054 A * | 4/1997 | Harrington ........... | C08F 210/02 526/126 |
| 8,790,753 B2 | 7/2014 | Müller et al. | |
| 2008/0234451 A1 | 9/2008 | Kenwright et al. | |
| 2012/0058332 A1* | 3/2012 | Muller ..................... | C08J 7/042 428/336 |
| 2012/0103496 A1* | 5/2012 | Incavo ..................... | B60C 5/14 152/537 |
| 2012/0205022 A1* | 8/2012 | Muller ............... | B29D 30/0681 152/564 |
| 2013/0041122 A1* | 2/2013 | Holtcamp ............... | C08F 32/08 526/171 |

FOREIGN PATENT DOCUMENTS

| | | |
|---|---|---|
| DE | 198 59 191 A1 | 6/2000 |
| EP | 0 488 135 A2 | 6/1992 |

(Continued)

OTHER PUBLICATIONS

International Search Report and Written Opinion issued Sep. 30, 2013 in PCT/EP2013/066287 (with English Translation of Categories).

*Primary Examiner* — William Cheung
(74) *Attorney, Agent, or Firm* — Oblon, McClelland, Maier & Neustadt, L.L.P.

(57) ABSTRACT

The use of a certain copolymer is described for reducing the gas-permeability of rubber material. A rubber material provided with a barrier material in the form of the copolymer is also described. The copolymer can be produced via ring-opening metathesis polymerization of a) one first olefin monomer selected from the group consisting of cyclic olefin monomers having at least one endocyclic C—C double bond, where no tertiary carbon atom bearing a hydrogen atom is present in alpha-position to the double bond, and b) one second olefin monomer selected from the group consisting of cyclic olefin monomers having one endocyclic C—C double bond, where a tertiary carbon atom bearing a hydrogen atom is present in at least one alpha-position to the double bond, where the copolymer has been oxidized at least to some extent, where the amount of polycyclic olefin monomers used to produce the copolymer with at least two C—C double bonds is zero or less than 1 mol %, based on the entirety of the monomers.

21 Claims, No Drawings

(56) References Cited

FOREIGN PATENT DOCUMENTS

| | | |
|---|---|---|
| EP | 0 824 125 A1 | 2/1998 |
| EP | 1 847 558 A1 | 10/2007 |
| WO | WO 93/20111 A2 | 10/1993 |
| WO | WO 96/04289 A1 | 2/1996 |
| WO | WO 97/03096 A1 | 1/1997 |
| WO | WO 97/06185 A1 | 2/1997 |
| WO | WO 00/46255 A1 | 8/2000 |
| WO | WO 02/26858 A1 | 4/2002 |
| WO | WO 2006/129379 A1 | 12/2006 |
| WO | WO 2009/154849 A1 | 12/2009 |
| WO | WO 2012/028530 A1 | 3/2012 |
| WO | WO 2012/107418 A1 | 8/2012 |
| WO | WO 2014/026865 A1 | 2/2014 |

* cited by examiner

RUBBER MATERIAL WITH BARRIER MATERIAL MADE OF CYCLOOLEFIN COPOLYMERS

CROSS REFERENCE TO RELATED APPLICATION

This application is a 371 of PCT/EP2013/066287, filed on Aug. 2, 2013, which claims the benefit of U.S. provisional application 61/682,334, flied on Aug. 13, 2012 and claims priority to European patent application 12180272.2, filed on Aug. 13, 2013.

The invention relates to the use of a certain copolymer for reducing the gas permeability of rubber material. The invention also relates to a rubber material provided with a barrier material in the form of the copolymer. The copolymer can be produced via ring-opening metathesis polymerization of a) one first olefin monomer selected from the group consisting of cyclic olefin monomers having at least one endocyclic C—C double bond, where no tertiary carbon atom bearing a hydrogen atom is present in alpha-position to the double bond, and b) one second olefin monomer having a C—C double bond selected from the group consisting of cyclic olefin monomers having one endocyclic C—C double bond, where a tertiary carbon atom bearing a hydrogen atom is present in at least one alpha-position to the double bond, where the copolymer has been oxidized at least to some extent.

In pneumatic tires it is important to ensure that the compressed air or the filler gas has the required pressure value and the necessary gas volume to maintain tire operation with functional capability for a maximum period. For this reason, the interior of conventional pneumatic tires usually has a rubber layer that is impermeable to gas or that has minimum gas permeability. Said tire inner layer serves to seal the gas-filled interior, and in tubeless tires it acts as replacement for the tube. An example of a material that can be used is halobutyl-containing, vulcanizable rubber mixture, or butyl rubber.

Polymers (polyalkenamers) produced via ring-opening metathesis polymerization are described in EP 1847558 A1 or in the U.S. patent application Ser. No. 61/257,063. Homopolymers produced via ring-opening metathesis polymerization of cycloolefins by starting from cyclooctene or from cyclopentadiene are often brittle materials which are thermosets or do not form films, and which are unsuitable for the formation of flexible coatings, or have poor barrier properties, or have glass transition temperatures that cannot be adjusted to the desired value. Polyalkenamers are also described in U.S. Pat. No. 4,025,708, U.S. Pat. No. 3,778,420, EP0488135, WO 2009/154849, WO 00/46255, and WO 02/26858. The documents do not describe the use of oxidized polyalkenamers for gas-barrier applications.

The use of certain copolymers produced via ring-opening metathesis polymerization from cycloolefins as gas barrier for rubber materials is described in the international patent application with the application number PCT/EP2012/051992, which is not a prior publication.

It was an object of the present invention to provide alternative barrier materials which are intended for rubber products, in particular for pneumatic tires, and which can be used in a manner which is simple, inexpensive, and efficient, and/or which have good or improved gas-barrier properties.

The invention provides the use of a copolymer for reducing the gas permeability of rubber material, where the copolymer can be produced via ring-opening metathesis polymerization of
a) at least one first olefin monomer selected from the group consisting of cyclic (preferably monocyclic) olefin monomers having at least one endocyclic C—C double bond, where no tertiary carbon atom bearing a hydrogen atom is present in alpha-position to the double bond, and
b) at least one second olefin monomer selected from the group consisting of cyclic olefin monomers having one (i.e. a single) endocyclic C—C double bond, where a tertiary carbon atom bearing a hydrogen atom is present in at least one alpha-position to the double bond,
where the copolymer has been oxidized at least to some extent, and
where the amount of polycyclic olefin monomers used to produce the copolymer with at least two C—C double bonds is zero or less than 1 mol %, based on the entirety of the monomers.

The invention also provides a rubber material modified by providing a barrier material in the form of the abovementioned copolymer that is described in more detail, where the copolymer has been oxidized at least to some extent.

It is preferable that the copolymer is used in the form of a polymer layer of thickness at least 1 µm. It is preferable that the molar ratio of olefin monomers a) to polycyclic olefin monomers b) is from 99:1 to 1:99; preferably from 90:10 to 10:90; particularly preferably from 50:50 to 80:20.

The invention also provides a pneumatic tire comprising a rubber material of the invention.

The invention also provides a process for modifying a rubber material by providing gas-barrier properties, where at least one of the abovementioned copolymers, described in more detail below, is applied to the rubber material or is introduced into the rubber material.

The rubber material to which the copolymer has been provided in the invention has a gas-barrier property (e.g. with respect to air, oxygen, nitrogen, argon, carbon dioxide, water vapour, etc.), where the barrier property is produced, or its level is increased, by the use of the copolymer in the invention. The expression barrier property means reduced transmission or permeability with respect to certain substances, in comparison with uncoated substrate. Oxygen- or gas-barrier properties can be measured by way of example by the permeability test described in the examples. It is preferable that the oxygen transmission rate for substrates coated in the invention is less than 30% of the value for the untreated substrates, in particular less than 15%, or less than 5%, e.g. from 0.1% to 3% (measured at 23° C. and 85% relative humidity).

The copolymers used in the invention can be produced via ring-opening metathesis polymerization. A metathesis reaction is very generally a chemical reaction between two compounds where a group is exchanged between two reactants. If this is an organic metathesis reaction, it can be formally represented as exchange of the substituents at a double bond. However, a particularly important reaction is the metal-complex-catalyzed ring-opening metathesis reaction of organic cycloolefin compounds ("ring-opening metathesis polymerization", abbreviated to ROMP), where this process provides access to polyolefins. Particularly catalytic metal complexes used are metal-carbene complexes of the general structure Met=$CR_2$, where R is an organic moiety. Because the metal-carbene complexes are very susceptible to hydrolysis, the metathesis reactions can be carried out in anhydrous organic solvents or in the olefins themselves (see by way of example US-A 2008234451, EP-A 0824125). In order to avoid complicated purification steps for the removal of large amounts of solvent or of unreacted olefins, it is also possible to carry out the metathesis reaction of olefins in an aqueous medium (DE 19859191; U.S. patent application 61/257,063).

The copolymers used in the invention are formed from
a) at least one first olefin monomer selected from the group consisting of cyclic olefin monomers having at least one endocyclic C—C double bond, where no tertiary carbon atom bearing a hydrogen atom is present in alpha-position to the double bond, and
b) at least one second olefin monomer selected from the group consisting of cyclic olefin monomers having one endocyclic C—C double bond, where a tertiary carbon atom bearing a hydrogen atom is present in at least one alpha-position to the double bond,
where the amount of polycyclic olefin monomers used to produce the copolymer with at least two C—C double bonds is zero or less than 1 mol %, preferably less than 0.9 mol % or less than 0.8 mol %, based on the entirety of the monomers.

The copolymers preferably involve pure hydrocarbons, i.e. not heteroatom-substituted hydrocarbons. The copolymers have preferably been oxidized at least to some extent at the tertiary C atoms in alpha-position to the endocyclic double bond.

The molar ratio of olefin monomers a) to olefin monomers b) is preferably from 99:1 to 1:99; with preference from 90:10 to 10:90; with particular preference from 50:50 to 80:20.

Examples of olefin monomers a) are cyclobutene, cyclopentene, 2-methylcyclopent-1-ene, 4-methylcyclopent-1-ene, cyclohexene, 2-methylcyclohex-1-ene, 4-methylcyclohex-1-ene, 1,4-dimethylcyclohex-1-ene, 3,3,5-trimethylcyclohex-1-ene, cycloheptene, 1,2-dimethylcyclohept-1-ene, cis-cyclooctene, trans-cyclooctene, 2-methylcyclooct-1-ene, 4-methylcyclooct-1-ene, 5-methylcyclooct-1-ene, cyclononene, cyclodecene, cycloundecene, cyclododecene, cyclooctadiene, cyclopentadiene, and cyclohexadiene, and particular preference is given here to monocyclic olefins having a C—C double bond, in particular cis-cyclooctene.

Preferred cyclic olefin monomers b) having only a single C—C double bond are 3-alkylcycloalk-1-enes preferably having from 1 to 10, or from 1 to 4, C atoms in the alkyl group, and preferably having from 5 to 8 C atoms in the cycloalkene ring, and also bicyclic olefins, e.g. norbornene. Examples of suitable compounds are 3-methylcyclopent-1-ene, 3-butylcyclopent-1-ene, 3-methylcyclohex-1-ene, 3-methylcyclooct-1-ene, 3-propylcyclopent-1-ene, and 3-methylcyclooct-1-ene. Norbornene is particularly preferred. It is preferable not to use any polycyclic dienes as olefin monomer b). The term polycyclic means compounds having at least two ring systems.

In one preferred embodiment, the copolymer has been formed via ring-opening metathesis polymerization of cis-cyclooctene and norbornene.

The copolymers used in the invention are preferably produced in an aqueous medium. The ring-opening metathesis reaction here can be carried out by using water and dispersing agent as initial charge in a polymerization vessel, dissolving, in the cycloolefin, an organometallic carbene complex used as catalyst, introducing the cycloolefin/metal complex solution into the aqueous solution of dispersing agent, converting the resultant cycloolefin/metal complex macroemulsion into a cycloolefin/metal complex miniemulsion, and reacting this at room temperature to give an aqueous polyolefin dispersion. The method used for the ring-opening metathesis reaction preferably uses, as initial charge, at least a portion of the water, at least a portion of dispersing agent, and at least a portion of the monomers in the form of an aqueous monomer macroemulsion with average droplet diameter greater than or equal to $\geq 2$ μm, and then, with introduction of energy, converts the monomer macroemulsion to a monomer mini-emulsion with average droplet diameter less than or equal to $\leq 1500$ nm, and then the resultant monomer miniemulsion, at polymerization temperature, is added to the optionally remaining residual amount of the water, the optionally remaining residual amount of the dispersing agent, the optionally remaining residual amount of the monomers, and the total amount of an organometallic carbene complex used as catalyst.

Organometallic carbene complexes can be used as metathesis catalysts. Examples of metals are transition metals of the 6th, 7th, or 8th transition group, preferably molybdenum, tungsten, osmium, rhenium, or ruthenium, among which preference is given to osmium and ruthenium. It is particularly preferable to use ruthenium-alkylidene complexes. Metathesis catalysts of this type are disclosed in the prior art and are described by way of example in R. H. Grubbs (ed.) "Handbook of Metathesis", 2003, Wiley-VCH, Weinheim, WO 93/20111, WO 96/04289, WO 97/03096, WO 97/06185, J. Am. Soc. 1996, pp. 784-790, Dalton Trans. 2008, pp. 5791-5799, and in Coordination Chemistry Reviews, 2007, 251, pp. 726-764.

The concentration of the copolymers in the solutions or aqueous dispersions used for the coating is preferably at least 1% by weight, in particular at least 5% by weight, and up to 50% by weight, or up to 70% by weight. The content of the copolymers in the aqueous dispersion is mostly from 10 to 60% by weight, or from 15 to 55% by weight, in particular from 20 to 50% by weight.

The viscosity of preferred aqueous dispersions of the copolymers at pH values of 4 and at a temperature of 20° C. is from 10 to 150 000 mPas, or from 200 to 5000 mPas (measured with a Brookfield viscometer at 20° C. and 20 rpm, spindle 4). The average particle size of the copolymer particles dispersed in the aqueous dispersion is by way of example from 0.02 to 100 μm, preferably from 0.05 to 10 μm. It can by way of example be determined with the aid of optical microscopy, of light scattering, of hydrodynamic chromatography, or of freeze-fracture electron microscopy.

The oxidation of the copolymers can be achieved via exposure to an oxygen-containing environment, preferably with use of radiant energy, thermal energy, and/or oxidation accelerators. By way of example, the copolymers can be oxidized in air in daylight and at room temperature (20° C.), e.g. exposure of copolymer or of copolymer films, or of substrates coated with the copolymer for, by way of example, from two to three weeks. The oxidation can be accelerated via radiant energy, thermal energy, gamma radiation, and/or chemical oxidation accelerators, e.g. transition metal compounds known for this purpose. Examples of oxidants that can be used are oxygen and peroxides.

The rubber constituents of the rubber material can by way of example have been selected from diene rubber, natural rubber, butyl rubber, synthetic polyisoprene, polybutadiene, styrene-butadiene copolymer, isoprene-butadiene rubber, styrene-isoprene-butadiene rubber, acrylonitrile-butadiene rubber, ethylene-propylene rubber, and chloroprene rubber.

It is preferable that the rubber material involves a constituent of a pneumatic tire, in particular an inner layer of a pneumatic tire, or involves a carcass of a pneumatic tire.

In one embodiment, the rubber materials themselves are provided with a solution or aqueous dispersion of at least one of the copolymers described above. In another embodiment, constituents of a rubber-containing article, in particular pneumatic tires, are modified with the barrier material and introduced into the rubber-containing article, preferably pneumatic tire. By way of example, the textile cord insert of pneumatic tires can be modified by providing the copolymers for use in the invention.

The invention also provides a process for modifying a rubber material, where at least one of the copolymers described herein is applied to the rubber material or is introduced into the rubber material. The modification can by way of example be achieved by one or more of the following methods: impregnation, spraying, spreading, coating, calendering. The dispersions or solutions used for the coating process can comprise further additives or auxiliaries, e.g. thickeners to adjust rheology, wetting aids, organic or inorganic fillers, or binders.

It is preferable that the copolymer is applied in the form of an aqueous dispersion of the copolymer, and a film is formed via drying of the dispersion on the backing substrate.

The invention also provides a pneumatic tire comprising a rubber material of the invention. The copolymer here can have been applied by one or more of the following methods:
- application on at least one portion of the surface or on the entire surface of the tire inner layer;
- introduction into the material of the tire inner layer;
- in the form of film, in the form of foil without backing, or in the form of coating on a foil backing, where the films or foils can have been introduced in addition to a rubber-based tire inner layer, or as replacement for a tire inner layer, into the tire interior;
- in the form of binder or coating of a fiber cord insert of the pneumatic tire;
- in the form of laminate introduced into the tire interior between two or more supportive foils.

The film can be applied in the form of a spraying film or spread film, e.g. via processes using rolls, doctor, airbrushes, or cast coating. The material can also be applied in the form of foil, which serves as backing and is then attached to the carcass by adhesive bonding or crosslinking (vulcanization). Examples of suitable foil backings are rubber-, polyolefin-, polyester-, polyamide-, and polyurethane-foil backings.

As an alternative, it is also possible to use the copolymer in the form of a laminate between two supportive foils, where the laminate is then attached to the carcass via adhesive bonding or crosslinking.

The copolymers can also be used in the form of self-supporting film.

The use can by way of example be realized on coating machinery by applying the coating composition to a supportive foil made of a plastic. To the extent that materials in web form are used, the polymer dispersion is usually applied from a trough by way of an applicator roll, and levelled with the aid of an airbrush.

Examples of other successful ways of applying the coating are the use of the reverse gravure process, the use of spray processes, or the use of a doctor roller, or the use of other coating methods known to the person skilled in the art. The substrate here has a coating on at least one side, i.e. it can be coated on one or both sides.

In order to achieve a further improvement in adhesion on a foil, the supportive foil can be subjected in advance to a corona treatment, or, as an alternative, adhesion promoters, such as polyethyleneimines, for example, can be used. The amounts applied to the materials in sheet form are by way of example preferably from 1 to 800 g (polymer, solids) per $m^2$, preferably from 1 to 400 $g/m^2$, or from 5 to 200 $g/m^2$. Once the coating compositions have been applied to the substrates, the solution or dispersion medium is evaporated. To this end, by way of example in the case of continuous operation, the material can be passed through a drying channel, possibly equipped with an infrared-source apparatus. The coated and dried material is then passed over a cooling roll and finally is wound up. The thickness of the dried coating is at least 1 μm, preferably from 1 to 400 μm, particularly preferably from 5 to 200 μm. The thickness of the supportive foils is generally in the range from 10 μm to 1 cm. The copolymer at the surface of the copolymer layer here has been oxidized at least to some extent. In the case of relatively thick layers, the inner region of the coating can comprise non-oxidized copolymer.

The substrates coated in the invention exhibit an excellent gas-barrier effect.

EXAMPLES

The following homopolymer dispersions and copolymer dispersions were used (monomer ratios of the copolymers are based on molar ratios):

Dispersion D1 (Comparison):
30% aqueous polyoctenamer dispersion produced via ring-opening metathesis polymerization (ROMP) from cis-cyclooctene with use of a ruthenium-alkylidene catalyst.
Number-average particle size: 378 nm Dispersion D2:
30% aqueous poly(norbornene-cooctenomer) dispersion produced via ring-opening metathesis polymerization (ROMP) from norbornene and cis-cyclooctene (50:50) with use of a ruthenium-alkylidene catalyst.
Number-average particle size: 499 nm Dispersion D3:
30% aqueous poly(norbornene-cooctenomer) dispersion produced via ring-opening metathesis polymerization (ROMP) from norbornene and cis-cyclooctene (20:80) with use of a ruthenium-alkylidene catalyst.
Number-average particle size: 307 nm Determination of Degree of Oxidation of the Polyalkenamer Foil:

The degree of oxidation of the polymers can be determined by means of infrared spectroscopy (Nexus 470 from Thermo Fischer Scientific, FTIR spectrometer with Diamant ATR unit (Smart Orbit ATR)). The evaluation method uses the extinction of the carbonyl bands at 1710+/−5 $cm^{-1}$ with base line in the range 1855+/−5 $cm^{-1}$ and 1498+/−5 $cm^{-1}$, and also extinction of the C—C double-bond bands at 970+/−5 $cm^{-1}$ with base line in the range 1001+/−5 $cm^{-1}$ and 918+/−5 $cm^{-1}$. The extinctions of the carbonyl group and of the C—C double bond are used to calculate a quotient. Table 1 shows the results.

TABLE 1

Degree of oxidation of polyalkenamer before and after three weeks of exposure to air at room temperature (about 20° C.)

| Specimen | C=O/C=C before exposure | C=O/C=C after exposure |
|---|---|---|
| D1 | 0.01 | 0.01 |
| D3 | 0.03 | 1.71 |

Determination of the Oxygen Permeability of a Self-Supporting Polyalkenamer Foil:

The foil was produced via casting of a polyalkenamer dispersion into a silicone mold measuring 15 cm×10 cm×0.5 cm (length×width×height). The cast dispersion film was dried for 48 h at 25° C., and then heat-conditioned for 10 minutes at a temperature of 65° C., and then stored for three weeks at room temperature.

The dry and moist oxygen permeability values were measured with a MOCON OXTRAN® 2/21, the principle of measurement of which is based on the carrier-gas method. Dry measurement at 0% humidity: ASTM D3985; moist measurement at increased humidity: ASTM F1927. In the carrier-gas method, an area of the masked specimen films, in this instance 5 cm² (without backing material) are installed in an airtight cell with a cavity on each side. A carrier gas (95% of $N_2$ and 5% of $H_2$) is conducted at atmospheric pressure over one side of the specimen, and the test gas (100% of $O_2$) is passed at atmospheric pressure over the other side. The test gas that diffuses through the specimen is entrained by the carrier gas and passed to a coulometric sensor. The concentration of oxygen can thus be determined as a function of time. All of the measurements were carried out at 23° Celsius and at a defined relative humidity (RH). Both sides of the specimen were exposed to the defined humidity. Conditioning of the equipment and of the specimen took about half an hour. The machine running time for the measurements was from 1 to 4 days. Two determinations were carried out on each specimen. The transmission rate ($cm^3/(m^2*day)$) of the specimen was standardized to 1 μm and 1 bar for the measuring process by including the average thickness of the foil in the calculation, this having been determined at 5 different locations. This standardization gave the permeation rate [$cm^3$ μm/($m^2*day*bar$)].

Table 2 collates the results (dry: at 0% humidity).

TABLE 2

Oxygen permeabilty of a self-supporting polyalkenamer foil

| Specimen | Film thickness [μm] | Transmission rate 23° C., dry [$cm^3$/($m^2*day$)] | Permeation rate 23° C., dry [$cm^3$μm/($m^2*day*bar$)] | Transmission rate 23° C., 85% RH [$cm^3$/($m^2*day$)] | Permeation rate 23° C., 85% RH [$cm^3$μm/($m^2*day*bar$)] |
|---|---|---|---|---|---|
| D1 | 641 | 2660 | $1.71 \times 10^6$ | — | — |
| D2 | 416 | 8.37 | $3.48 \times 10^3$ | 8.95 | $3.82 \times 10^3$ |
| D3 | 448 | 8.30 | $3.72 \times 10^3$ | 5.88 | $2.63 \times 10^3$ |
| D3*⁾ | 448 | 458 | | 632 | |

*⁾Transmission after 24 hours (not oxidized)

The results show that the non-oxidized specimens D3 (before exposure) and D1 exhibit markedly poorer oxygen-barrier effect than the oxidized specimens D2 and D3 (after exposure) of the invention.

Determination of the Water-Vapor Permeability of a Self-Supporting Polyalkenamer Foil:

The foil was produced as described above. The water-vapor permeabilities were measured at 85% relative humidity with a MOCON PERMATRAN-W® 3/33, the principle of measurement of which is likewise based on the carrier-gas method. The equipment operates in accordance with ASTM F1249. In the carrier-gas method, an area of the masked specimen films, in this instance 5 cm² (without backing material) are installed in an airtight cell with a cavity on each side. A carrier gas (dry $N_2$) is conducted at atmospheric pressure over one side of the specimen, and the test gas ($N_2$ and water vapor) is passed at atmospheric pressure over the other side. The test gas that diffuses through the specimen is entrained by the carrier gas and passed to a selective sensor. The water-vapor-measurement equipment used is an IR sensor. It is thus possible to determine the concentration of water vapor as a function of time. The measurements were carried out at 23° Celsius. The conditioning of the equipment took about 30 minutes. The transmission rate of the specimen was measured with relative humidity set with maximum precision to 85%, and a calculation was then used to correct the small metrological error in the setting of the moisture level. Linear correlation between transmission rate and relative humidity in the measuring region was assumed here. The transmission rate ($cm^3/(m^2*day)$) of the specimen was standardized for the measuring process by including the average thickness of the foil in the calculation, this having been determined at 5 different locations. This standardization gave the permeation rate ($g*μm/(m^2*day)$).

Table 3 lists the results. The thickness of the foil was 439 μm.

TABLE 3

Water-vapor permeabilty of a self-supporting polyalkenamer foil

| Specimen | Transmission rate 23° C., 85% RH [$g/(m^2 * day)$] | Permeation rate 23° C., 85% RH [$g * μm/(m^2 * day)$] |
|---|---|---|
| D3 | 5.30 | 2330 |

Determination of the Oxygen Permeability of a Polyalkenamer-Coated Rubber Foil:

The oxygen-barrier effect was measured by determining the oxygen transmission of a natural rubber substrate coated with poly(norbornene-cooctenamer). The oxygen barrier was determined with a MOCON OXTRAN® 2/21, the principle of measurement of which is based on the carrier-gas method (ASTM D3985). Measurements were made at 23° C. with synthetic air (21% of oxygen). Two determinations were carried out on each specimen. The oxygen-barrier effect was measured at 0% and 85% relative humidity.

Specimen 1:
Uncoated natural rubber (Erwin Telle GmbH, Nuremberg), Substrate thickness: 346 μm Specimen 2:
A natural rubber substrate (Erwin Telle GmbH, Nuremberg) of thickness 346 μm was cleaned with ethanol, coated with poly(norbornene-cooctenamer) of dispersion D2, dried for 10 min at 50° C., and then kept at room temperature for 14 days. The thickness of the poly(norbornene-co-octenamer) coating on the natural rubber substrate was 35 μm.

Table 4 collates the oxygen-barrier-effect results:

TABLE 4

Oxygen-barrier effect on rubber substrate

| Specimen | Transmission rate [$cm^3/(m^2 * day)$], 0% relative humidity | Transmission rate [$cm^3/(m^2 * day)$], 85% relative humidity |
|---|---|---|
| Specimen 1 | 5010 | 5080 |
| Specimen 2 | 29.1 | 40.6 |

The invention claimed is:

1. A process, comprising
performing a ring-opening metathesis polymerization of
   a) at least one first olefin monomer which is a cyclic olefin monomer having at least one endocyclic C—C double bond, such that no tertiary carbon atom bearing a hydrogen atom is present in an alpha-position to the double bond, and
   b) at least one second olefin monomer which is a cyclic olefin monomer having one endocyclic C—C double bond, such that a tertiary carbon atom bearing a hydrogen atom is present in at least one alpha-position to the double bond, and
oxidizing the copolymer to form an oxidized copolymer,
wherein an amount of polycyclic olefin monomer having at least two C—C double bonds which is incorporated into the copolymer is zero or less than 1 mol %, based on an entire mol % of monomers being 100 mol %.

2. The process of claim 1, further comprising producing a barrier film from an aqueous dispersion of the copolymer.

3. The process of claim 2, wherein at least one of conditions i) and ii) is satisfied:
   i) a molar ratio of the at least one first olefin monomer a) to the at least one second olefin monomer b) is from 99:1 to 1:99; and
   ii) a layer thickness of the copolymer is at least 1 μm.

4. The process of claim 1, wherein the copolymer has been oxidized at tertiary C atoms in alpha-position to the endocyclic double bond.

5. The process of claim 1, wherein the at least one first olefin monomer is cis-cyclooctene and the at least one second olefin monomer is norbornene.

6. A rubber material modified with a barrier material in the form of a copolymer produced by the process of claim 1.

7. The rubber material of claim 6, wherein the copolymer has been oxidized at tertiary C atoms in alpha-position to the endocyclic double bond.

8. The rubber material of claim 6, wherein a layer thickness of the copolymer is at least 1 μm and copolymer at a surface of the copolymer layer has been oxidized.

9. The rubber material of claim 6, wherein a molar ratio of the at least one first olefin monomer a) to the at least one second olefin monomer b) is from 99:1 to 1:99.

10. The rubber material of claim 6, wherein the copolymer is a ring-opening metathesis polymer of cis-cyclooctene and norbornene.

11. The rubber material of according to claim 6, comprising at least one rubber constituent selected from the group consisting of a diene rubber, a natural rubber, a butyl rubber, a synthetic polyisoprene, a polybutadiene, a styrene-butadiene copolymer, an isoprene-butadiene rubber, a styrene-isoprene-butadiene rubber, an acrylonitrile-butadiene rubber, an ethylene-propylene rubber, and a chloroprene rubber.

12. A pneumatic tire, comprising the rubber material of claim 6.

13. The pneumatic tire of claim 12, wherein the rubber material is contained within an inner layer of a pneumatic tire or is contained within a carcass of the pneumatic tire.

14. The pneumatic tire of claim 12, wherein the copolymer has been applied:
   by applying the copolymer on at least one portion of a surface or on the entire surface of an inner layer of the pneumatic tire;
   by introducing the copolymer into a material of the inner layer of the pneumatic tire;
   in the form of film, in the form of foil without backing, or in the form of coating on a foil backing, where the films or foils can have been introduced in addition to a rubber-based tire inner layer, or as replacement for a tire inner layer, into the tire interior;
   in the form of binder or coating of a fiber cord insert of the pneumatic tire;
   in the form of laminate introduced into the tire interior between two or more supportive foils;
   or a combination thereof.

15. A process for modifying a rubber material by providing gas-barrier properties, the process comprising applying at least one copolymer to the rubber material or inserting the at least one copolymer into the rubber material, where the copolymer is produced by the process of claim 1.

16. The process of claim 15, wherein the modification occurs by one or more of: impregnation by saturation, by spraying, by spreading, by coating, or by calendering.

17. The process of claim 15, wherein the copolymer is applied in the form of an aqueous dispersion of the copolymer, and a film is formed by drying the dispersion on a substrate.

18. The process of claim 1, wherein oxidation of the copolymer occurs by exposing the copolymer to an oxygen-containing environment.

19. The process of claim 18, wherein the oxidation occurs in the presence of radiant energy, thermal energy, at least one oxidation accelerator, or a mixture thereof.

20. The process of claim 1, wherein a molar ratio of the at least one first olefin monomer a) to the at least one second olefin monomer b) is from 90:10 to 10:90.

21. The process of claim 1, wherein a molar ratio of the at least one first olefin monomer a) to the at least one second olefin monomer b) is from 50:50 to 80:20.

* * * * *